(12) United States Patent
Nakayama et al.

(10) Patent No.: US 10,318,805 B2
(45) Date of Patent: Jun. 11, 2019

(54) PATTERN MATCHING METHOD AND APPARATUS

(71) Applicant: Hitachi High-Technologies Corporation, Minato-ku, Tokyo (JP)

(72) Inventors: Hideki Nakayama, Hitachinaka (JP); Masashi Sakamoto, Hitachinaka (JP)

(73) Assignee: HITACHI HIGH-TECHNOLOGIES CORPORATION, Tokyo (JP)

( * ) Notice: Subject to any disclaimer, the term of this patent is extended or adjusted under 35 U.S.C. 154(b) by 0 days.

(21) Appl. No.: 13/783,333

(22) Filed: Mar. 3, 2013

(65) Prior Publication Data
US 2013/0278748 A1  Oct. 24, 2013

(30) Foreign Application Priority Data
Apr. 24, 2012 (JP) ................. 2012-099071

(51) Int. Cl.
*H04N 7/18* (2006.01)
*G06K 9/00* (2006.01)
*G06T 7/00* (2017.01)
*G06T 7/33* (2017.01)

(52) U.S. Cl.
CPC .......... *G06K 9/00536* (2013.01); *G06T 7/001* (2013.01); *G06T 7/33* (2017.01); *G06T 2207/10061* (2013.01); *G06T 2207/30148* (2013.01)

(58) Field of Classification Search
CPC .......... H05K 13/08; G06T 2207/30148; G06T 2207/10061; G06T 7/001; G06T 7/33; G06K 9/00536

USPC ........................................... 348/87
See application file for complete search history.

(56) References Cited

U.S. PATENT DOCUMENTS

| | | | | |
|---|---|---|---|---|
| 5,347,592 A * | 9/1994 | Yasuda et al. | ............... | 382/144 |
| 5,369,430 A * | 11/1994 | Kitamura | ....................... | 348/94 |
| 5,872,862 A | 2/1999 | Okubo et al. | | |
| 6,952,492 B2 * | 10/2005 | Tanaka et al. | ............... | 382/149 |
| 7,856,137 B2 | 12/2010 | Yonezawa et al. | | |
| 8,041,104 B2 | 10/2011 | Toyoda et al. | | |
| 8,401,228 B2 * | 3/2013 | Muramatsu | ........... | G06K 9/6256 348/208.14 |
| 2004/0119023 A1 * | 6/2004 | Nakasuji et al. | .......... | 250/396 R |
| 2007/0045538 A1 * | 3/2007 | Ikeda et al. | ................... | 250/310 |
| 2008/0069453 A1 * | 3/2008 | Abe | .................... | G06K 9/6203 382/209 |

(Continued)

FOREIGN PATENT DOCUMENTS

JP  2007-103645 A  4/2007
JP  2011-090470 A  5/2011

*Primary Examiner* — Farzana Hossain
(74) *Attorney, Agent, or Firm* — Miles & Stockbridge P.C.

(57) ABSTRACT

When the degree of matching between patterns decreases due to a pattern fluctuation or an appearance fluctuation that has occurred during manufacturing steps, a heavy work burden would be placed on an operator. A data processing unit of a pattern matching apparatus calculates a threshold for determination of matching between a first template image and a partial region of a search target image obtained by capturing an image of the surface of a sample, on the basis of a result of evaluation of a similarity between the search target image and a second template image, the second template image having been captured in a wider range than the first template image.

9 Claims, 16 Drawing Sheets

(56) References Cited

U.S. PATENT DOCUMENTS

2012/0207397 A1    8/2012  Nagatomo et al.

* cited by examiner

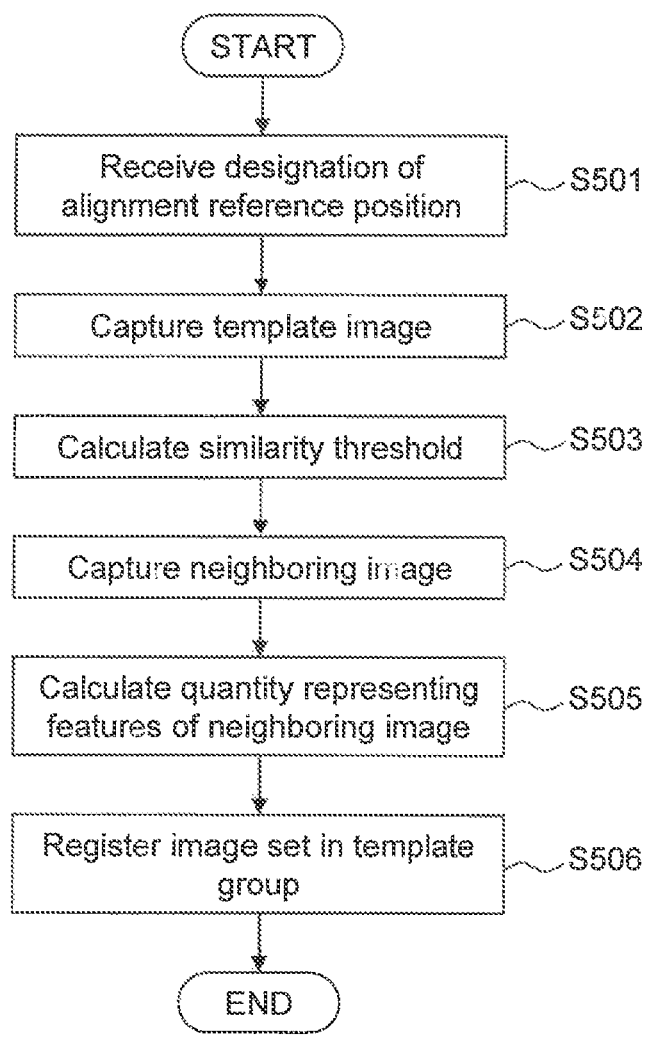

601=604A+604B+604C+604D

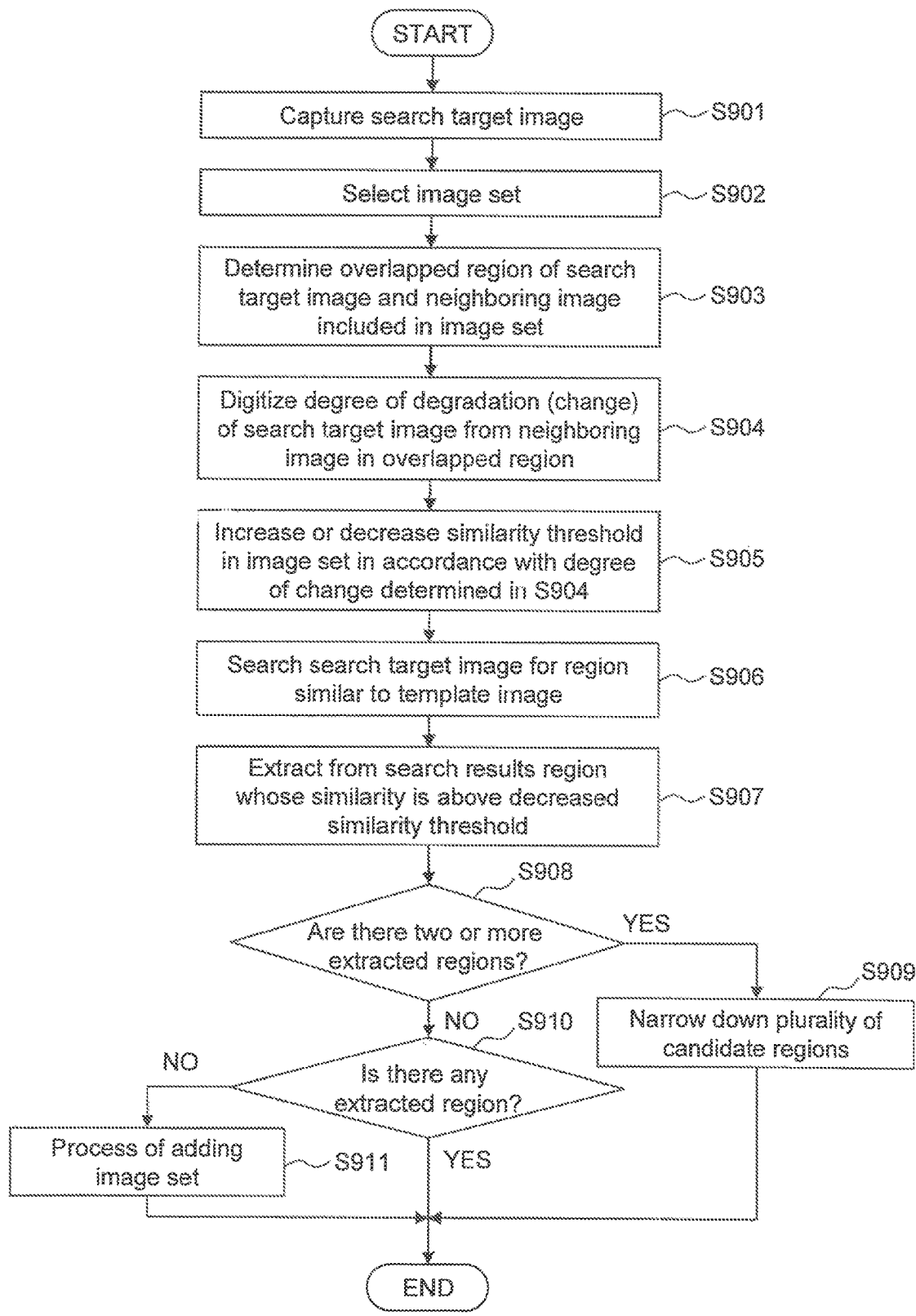

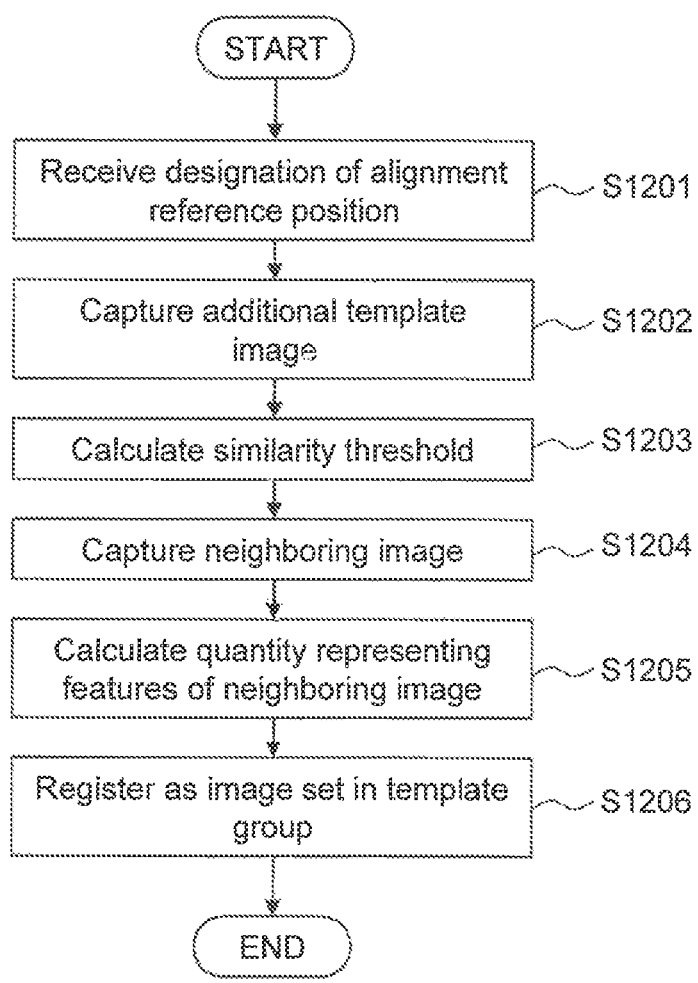

PATTERN MATCHING METHOD AND APPARATUS

BACKGROUND

1. Technical Field

The present invention relates to a pattern matching technology. For example, the present invention relates to a pattern matching method and apparatus for identifying the position of a pattern formed on the surface of a sample.

2. Background Art

A pattern matching technology is known as one of the technologies used to measure or test a fine structure on the surface of a sample, such as a semiconductor circuit. The pattern matching technology is a technology of identifying the position of a pattern on the basis of a similarity between a sample image and a reference image referred to as a template.

FIG. 1-1 and FIG. 1-2 slow process procedures that are typically used in pattern matching. FIG. 1-1 shows a process procedure used for registration of a template, and FIG. 1-2 shows a process procedure executed when alignment is performed using the template.

A pattern registration process is started after the alignment reference position coordinates are designated and input to a pattern matching apparatus with a SEM (Scanning Electron Microscope) (step S101). A given point on a semiconductor wafer is input as the alignment reference position coordinates.

Next, the pattern matching apparatus captures an image of a predetermined region on the semiconductor wafer as a template image (step S102). The image capturing position is set manually by a user at a position around the alignment reference position coordinates, for example. Besides, there are also cases where the pattern matching apparatus automatically calculates a region in which a unique pattern exists as the image capturing position.

Next, the pattern matching apparatus calculates a similarity threshold on the basis of the captured template image (S103). The similarity threshold is, when a plurality of regions that are similar to the template image are obtained from a search target image, calculated as an intermediate value between the highest similarity and the next highest similarity. Needless to say, other calculation methods may also be used.

Next, the pattern matching apparatus registers as template information (1) the captured template image, (2) the similarity threshold, (3) the alignment reference position coordinates, and (4) a relative distance between the alignment reference position coordinates and the template image (step S104). FIG. 2 shows a relationship among the template image 201, the alignment reference position coordinates 202, and the relative distance 203 between the template image 201 and the alignment reference position coordinates 202.

Next, a procedure of a matching process will be described. The pattern matching apparatus captures as a search target image an image of a region around the alignment reference position coordinates designated and input in step S101 (step S105).

Next, the pattern matching apparatus searches the search target image for a region that is similar to the template image (step S106). Then, the pattern matching apparatus extracts a region with the highest similarity from the search results (step S107).

Next, the pattern matching apparatus determines if the similarity of the extracted region is above the threshold (step S108). If the result of step S108 is positive, the pattern matching apparatus terminates the alignment process (step S109). Meanwhile, when the result of step S108 is negative, the pattern matching apparatus receives an input/designation of the alignment reference position coordinates (step S110), and then terminates the alignment process (step S109).

Patent Document 1: JP Patent Publication No. 2011-090470A

Patent Document 1: JP Patent Publication No. 2007-103645A

SUMMARY

The aforementioned pattern matching technology is applied to automatic alignment that is needed for a defect test, a defect review, measurement, and the like. However, there are cases where automatic alignment fails. In such cases, a user should manually designate and input an alignment reference position to the pattern matching apparatus. Thus, a failure of the automatic alignment results in a decrease in the automation rate of the pattern matching and a decrease in the operating rate of the apparatus.

A failure of pattern matching is considered to occur because how patterns on a semiconductor wafer look changes for some reasons. For example, when a semiconductor device is formed by stacking a plurality of layers, if a pattern of a lower layer, which should be covered with an upper layer, is exposed from the upper layer in measurement or a test of the produced semiconductor device, it is considered that the pattern of the lower layer is visible through the upper layer, for example, in addition, even when patterns are formed through identical manufacturing steps, there are cases where the way in which the patterns look varies due to fluctuations in the line widths or hole diameters of the patterns, variations in the film thickness on the surface of the wafer, or the like resulting from manufacturing variations. In such cases, a similarity between a search target image and a template image would decrease (a calculated similarity score would be below the threshold), resulting in a failure of the pattern matching.

As a measure to avoid such a problem, various methods have been studied so far. For example, a method of setting a low similarity threshold is known. When a low similarity threshold is set, it is possible to suppress cases where pattern matching is determined to have failed. Meanwhile, when a low similarity threshold is set, there is an increasing risk of error detection of patterns. Thus, an operator should avoid failures of pattern matching by registering a different template image for each step.

However, a semiconductor device is manufactured through a number of steps. Therefore, performing an operation of registering a different template image for each step would be a great burden for an operator. For such reasons, it is demanded that a common template image be used for alignment in each step. As a known proposal for realizing the use of a common template image in each step, there is a method of registering a template image in which how patterns look is unlikely to change due to variations in the manufacturing steps or manufacturing variations.

However, when using this method, the operator should grasp how a pattern will change, in which step the pattern will change, and what kind of manufacturing variations will be generated. Thus, it is difficult to select a place to be registered.

Besides, Patent Document 1 describes a template matching method of, by providing in a template a region to be not collated with a real image, maintaining a state in which the degree of matching between the template and the real image is high.

However, in this method, an operator should set in advance a region to be not collated in the template. In addition, in order to set a region to be not collated, the operator should grasp in advance which portion of a pattern will change during the manufacturing steps. Thus, the template registration operation is not easy.

As an alternative, there is also known a method of registering patterns of a plurality of portions as template images, and, if pattern matching for any of the template images is successful, using the result for alignment.

However, this method would increase a burden of registering a plurality of template images. In addition, even if registration of a plurality of template images is possible, it is still difficult to select positions for registration unless an operator fully knows how patterns will change during the manufacturing steps.

As an improvement of the aforementioned method, Patent Document 2 proposes to register a plurality of pieces of design data (CAD data) as templates. When CAD data is used, it becomes easy to grasp the relevance between the manufacturing steps.

However, as CAD data is data with an extremely large volume, an investment in a facility that can handle such data would be a great burden. In addition, there may be a case where an operator is not allowed to handle the CAD data for security reasons. Further, another problem would arise that, for example, a new algorithm for which OPC (Optical Proximity Correction) and the like are taken into consideration should be introduced into matching between the CAD data and a real image.

To conclude, in the field of pattern matching, it is currently demanded to suppress failures of pattern matching and avoid an increase in the number of template registration operations. Thus, the present invention provides a pattern matching technology that can absorb changes in how patterns look and does not place a heavy operation burden on an operator.

In order to solve the aforementioned problems, a pattern matching technology in accordance with the present invention calculates a threshold for determination of matching between a first template image and a partial region of a search target image obtained by capturing an image of a surface of a sample, on the basis of a result of evaluation of a similarity between the search target image and a second template image, the second template image having been captured in a wider range than the first template image.

According to the present invention, it is possible to, even when the degree of matching between patterns decreases due to a pattern fluctuation or an appearance fluctuation that has occurred during manufacturing steps, automatically optimize a threshold for determination of matching and suppress failures of pattern matching without increasing the operation burden on an operator. Other problems, configurations, and advantages will become apparent from the following description of embodiments.

BRIEF DESCRIPTION OF THE DRAWINGS

FIG. 1-2 is a diagram showing a typical matching process procedure using the template;

FIG. 2 is a diagram illustrating typical information registered as template information;

FIG. 4-1 is a diagram showing an overview of a defect review process for a semiconductor wafer;

FIG. 4-2 is a diagram illustrating a global alignment process operation;

FIG. 5 is a diagram illustrating an overview of a process of registering a template image in accordance with an embodiment;

FIG. 9 is a diagram illustrating a pattern matching process in accordance with an embodiment;

FIG. 12 is a diagram illustrating a process of adding a new image set to a template group.

DETAILED DESCRIPTION

Figure 1:
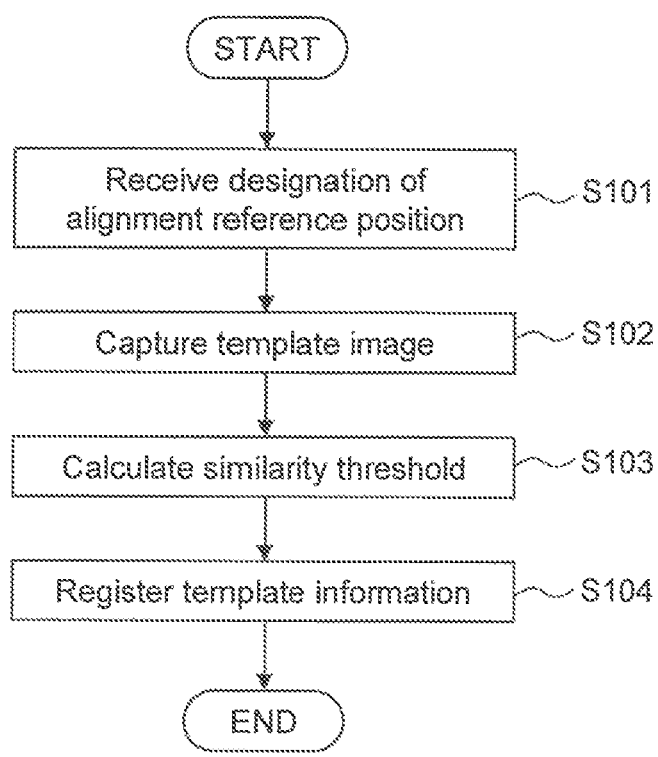
FIG. 1-1 is a diagram showing a typical template registration procedure.

Hereinafter, embodiments of the present invention will be described with reference to the accompanying drawings. It should be noted that the embodiments of the present invention are not limited to those described below, and various modifications and variations are possible in so far as they are within the spirit and scope of the present invention.

[Summary of Pattern Matching Method in Accordance with Embodiment]

A pattern matching method in accordance with an embodiment also includes a template image registration process and a pattern matching process. The template image registration process in accordance with an embodiment provides an operator with operability that is about equal to the operability of a commonly known template registration process. Specifically, a registration process in accordance with an embodiment provides a registration process that needs no knowledge about registration of a pattern for each of a plurality of steps or a pattern deformation that would occur during the plurality of steps. At the same time, the registration process in accordance with the embodiment also provides a function of automatically capturing a template image corresponding to a pattern fluctuation and storing the captured image. Meanwhile, a pattern matching process in accordance with an embodiment provides a function of suppressing failures of pattern matching by automatically detecting a pattern fluctuation from a search target image and optimizing a similarity threshold.

In addition, a pattern matching process in accordance with an embodiment provides a function of when a similarity calculated as a result of pattern matching is below the threshold and the pattern matching thus fails, automatically registering a new, additional template image without placing a burden on an operator. Specifically, the pattern matching process in accordance with the embodiment provides a function of additionally learning a template image for which pattern matching has failed and thereby suppressing failures in the next and subsequent pattern matching.

In addition, a pattern matching process in accordance with an embodiment provides a function of, when a plurality of pattern matching candidates whose similarities are above a similarity threshold are obtained, automatically selecting the most reliable candidate using coordinate information determined from a wide-field image (hereinafter also referred to as a "neighboring image") that is less susceptible to the influence of pattern fluctuations.

[Configuration of Pattern Matching Apparatus]

Hereinafter, a case where a pattern matching apparatus in accordance with an embodiment is implemented as a semiconductor defect review apparatus will be described. In the following description, a case where the pattern matching apparatus includes an electron beam scanning microscope that irradiates a sample (a semiconductor wafer) with an electron beam will be described. However, the semiconductor defect review apparatus may also include a FIB (Focused Ion Beam) apparatus that irradiates the surface of a sample with an ion beam.

Figure 3:
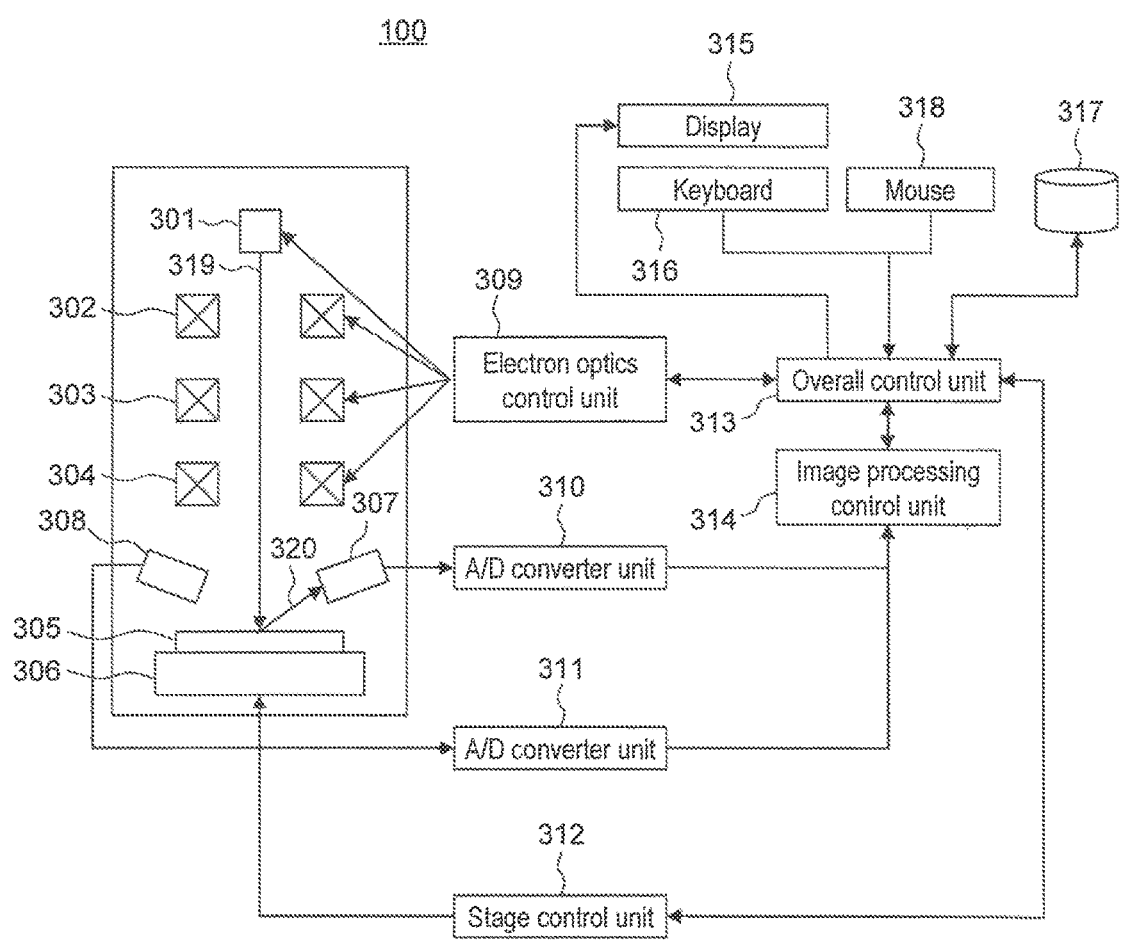
FIG. 3 is a diagram showing a fundamental configuration example of a SEM-type semiconductor defect review apparatus.

FIG. 3 is a configuration diagram of a semiconductor defect review apparatus in accordance with an embodiment. A semiconductor defect review apparatus 100 includes an electron gun 301, a lens 302, a deflector 303, an objective lens 304, a stage 306 on which a semiconductor wafer 305 is placed, a secondary particle detector 307, an optical camera 308, an electron optics control unit 309, A/D converter units 310 and 311, a stage control unit 312, an overall control unit 313, an image processing control unit 314, a display 315, a keyboard 316, a storage device 317, and a mouse 318.

An electron beam 319 emitted from the electron gun 301 is converged by the lens 302. The electron beam 319 that has passed through the lens 302 is, after being deflected by the deflector 303, converged by the objective lens 304 and then irradiates the semiconductor wafer 305. Secondary particles 320 such as secondary electrons or reflected electrons are generated from the semiconductor wafer 305 according to the shape and material of the semiconductor wafer 305. The generated secondary particles 320 are detected by the secondary particle detector 307, and are output as a detection signal in analog format. The detection signal from the secondary particle detector 307 is converted from the analog signal into a digital signal by the A/D converter unit 310. A SEM image is formed through such conversion. The thus formed SEM image is supplied to the image processing control unit 314, and is then used for image processing such as pattern matching, defect detection, and defect classification.

The optical camera 308 detects a light beam that has irradiated the semiconductor wafer 305 from a light source (not shown) and has been reflected and scattered by the surface of the semiconductor wafer 305. A detection signal in analog format output from the optical camera 308 is converted from the analog signal into a digital signal by the A/D converter unit 311. An optical microscopic image is formed through such conversion. The thus formed optical microscopic image is supplied to the image processing control unit 314 as in the case of the SEM image, and is then used for image processing such as pattern matching, defect detection, and defect classification.

The electron gun 301, the lens 302, the deflector 303, and the objective lens 304 are controlled by the electron optics control unit 309. Position control for the semiconductor wafer 305 is executed on the stage 306 controlled by the stage control unit 312. The overall control unit 313, on the basis of inputs from the keyboard 316, the mouse 318, and the storage device 317, controls the electron optics control unit 309, the stage control unit 312, the image processing control unit 314, and the like. Each of the electron optics control unit 309, the overall control unit 313, and the image processing control unit 314 is configured by a computer. That is, each control unit is configured by an arithmetic unit (CPU), ROM, RAM, an internal storage device, and an I/O interface. A pattern matching process program in accordance with an embodiment is read from the internal storage device, for example, and is then executed. The overall control unit 313 displays a processing result and an operation screen on the display 315. In addition, the overall control unit 313 writes the processing result to the storage device 317. The storage device 317 stores the input SEM image together with additional information such as the electron optical conditions at the acquisition time and a recognition number ID of the semiconductor defect review apparatus.

[Content of Defect Review]

Figures 1, 4:
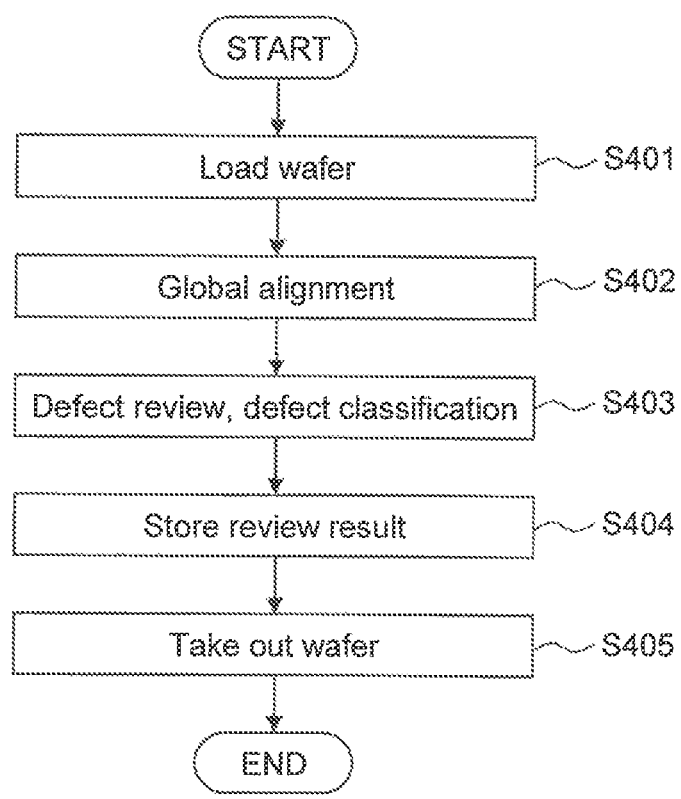
Figures 2, 4:
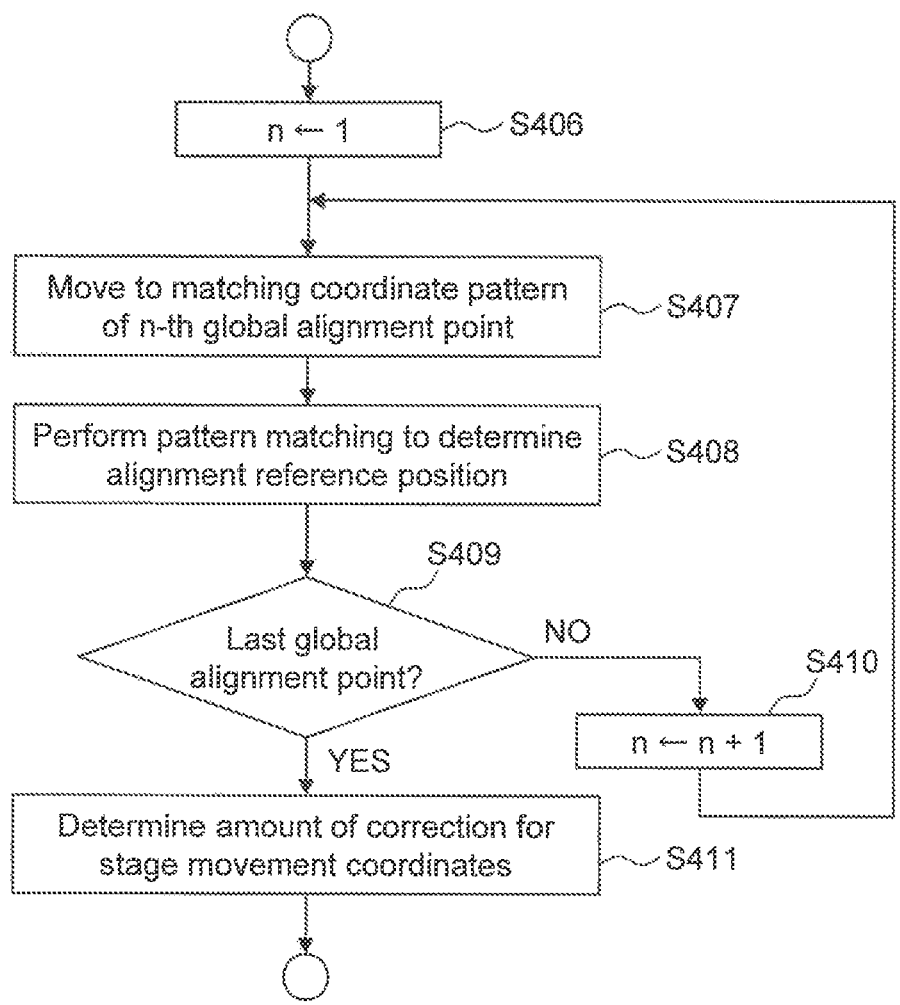

FIG. 4-1 is a diagram showing an overview of a defect review process executed in the semiconductor defect review apparatus 100. When executing a defect review, the semiconductor defect review apparatus 100 loads the semiconductor wafer 305 to be reviewed into the apparatus, and places it on the stage 306 (step S401).

Next, the semiconductor defect review apparatus 100 executes global alignment to determine the amount of correction for the stage movement coordinates (step S402). The amount of correction is calculated on the basis of the amount of positional displacement of the semiconductor wafer 305, the amount of distortion of the semiconductor wafer 305, and the like. The details of the process operation executed in the global alignment are described below.

Next, the semiconductor defect review apparatus 100 executes defect review and defect classification while correcting the stage movement coordinates using the amount of correction determined in step S402 (S403).

Next, the semiconductor defect review apparatus 100 stores the result of review (step S404). The result of review is stored in the storage device 317 and the like. Note that there are also cases where the semiconductor defect review apparatus 100 transmits the result of review to a yield management system or the like.

Finally, the semiconductor defect review apparatus 100 takes the semiconductor wafer 305 out of the stage 306 (step S405).

Figures 1, 2:
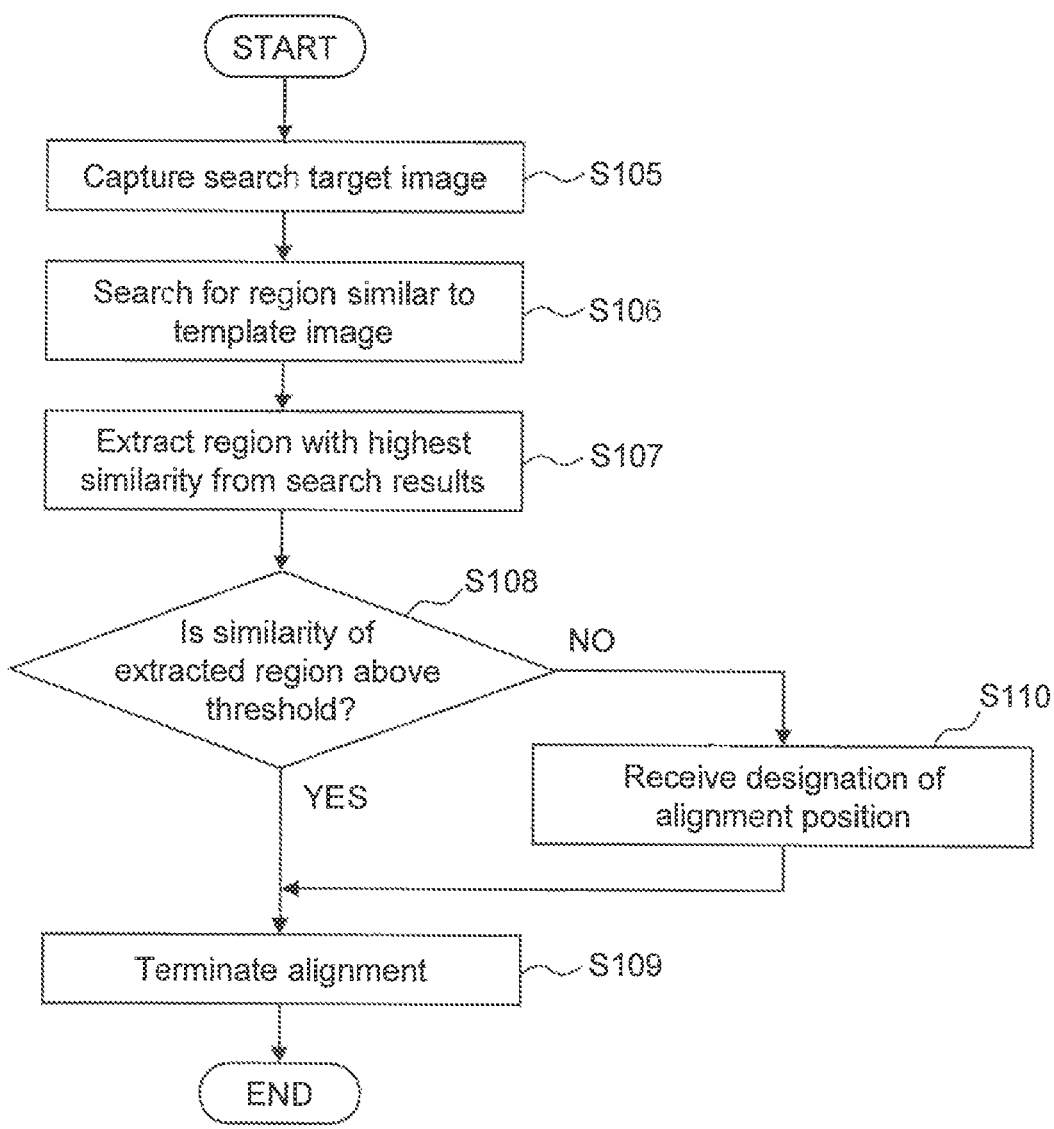
Figure 2:
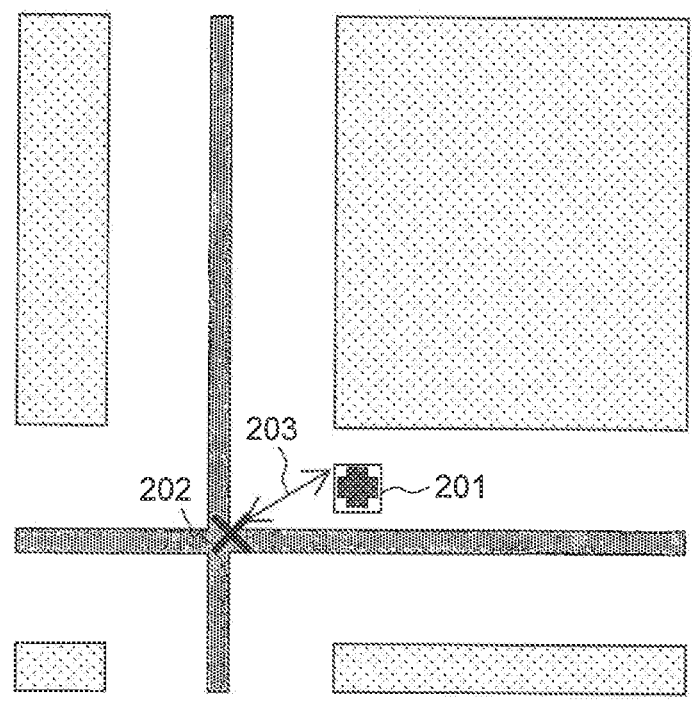

FIG. 4-2 shows the details of a process operation executed in the global alignment (step S402).

First, the semiconductor defect review apparatus 100 resets a counter n, which gives the n-th global alignment point, to 1 (step S406). Next, the semiconductor defect review apparatus 100 moves the stage 305 to a matching coordinate pattern corresponding to the n-th global alignment point (a pattern associated with a template image described below) (step S407).

Next, the semiconductor defect review apparatus 100 executes a matching process through image processing to determine the alignment reference position coordinates (step S408). The matching process is executed by the image processing control unit 314, for example. Needless to say, the overall control unit 313 may execute a part or all of the matching process.

After executing the matching process, the semiconductor defect review apparatus 100 determines if the currently executed matching process has been executed on the last global alignment point (step S409). When the result of step S409 is negative, the semiconductor defect review apparatus 100 increments the counter n by one, and the process returns to step S407 (step S410). Through such a determination process, a matching process is repeatedly executed on the number of global alignment points designated with a recipe in advance.

When a matching process for all global alignment points is complete (when the result of step S409 is positive), the semiconductor defect review apparatus 100 determines the amount of correction for the stage movement coordinates (step S411).

A pattern matching process in accordance with an embodiment described below can also be applied to calculation of the alignment reference point coordinates in step S408 and creation of a template image for matching used for the calculation, for example.

[Pattern Matching Process]

Hereinafter, a pattern matching process executed by the semiconductor defect review apparatus 100 in accordance with an embodiment will be described. As described previously, a pattern matching process includes a template image registration process and a pattern matching process. The pattern matching process is implemented by a cooperative operation of the overall control unit 313 and the image processing control unit 314.

FIG. 5 shows a process of registering a template image (hereinafter referred to as "template registration"). The semiconductor defect review apparatus 100, upon receiving an input of an operation from an operator, receives given coordinate points on the semiconductor wafer 305 as the alignment reference position (step S501).

Next, the semiconductor defect review apparatus 100 captures an image of the semiconductor wafer 305 at a predetermined position as a template image (step S502). The position of capturing the template image may be manually set by a user around the alignment reference position, or be set by automatically calculating a region in which a unique pattern exists with the semiconductor defect review apparatus 100, for example. Besides, the image capturing position may be determined with any other methods. In this specification, the "template image" will also be referred to as a "first template image." The "first template image" is used as a pattern for local matching.

Next, the semiconductor defect review apparatus 100 calculates a similarity threshold on the basis of the captured template image (step S503). The similarity threshold is, when a plurality of regions that are similar to the template image are obtained from a search target image, for example, calculated as an intermediate value between the highest similarity and the next highest similarity. Needless to say, other calculation methods may also be used.

Next, the semiconductor defect review apparatus 100 captures an image of a region that includes the template image or a neighboring pattern thereof and is larger than the template image (step S504). In this specification, such a captured image will be referred to as a "neighboring image." The neighboring image is one of pieces of information that are characteristic of the pattern matching process in accordance with this embodiment. In this specification, the "neighboring image" will also be referred to as a "second template image." The "second template image" is a pattern for global matching.

Figure 6A:
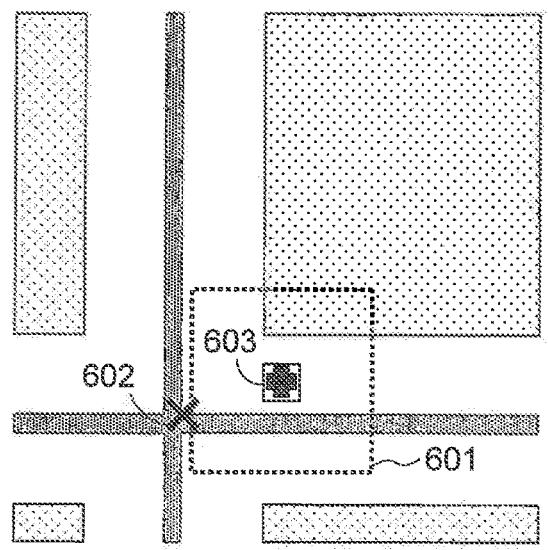
FIGS. 6A to 6C are diagrams showing a positional relationship between a template image and a neighboring image.
Figure 6B:
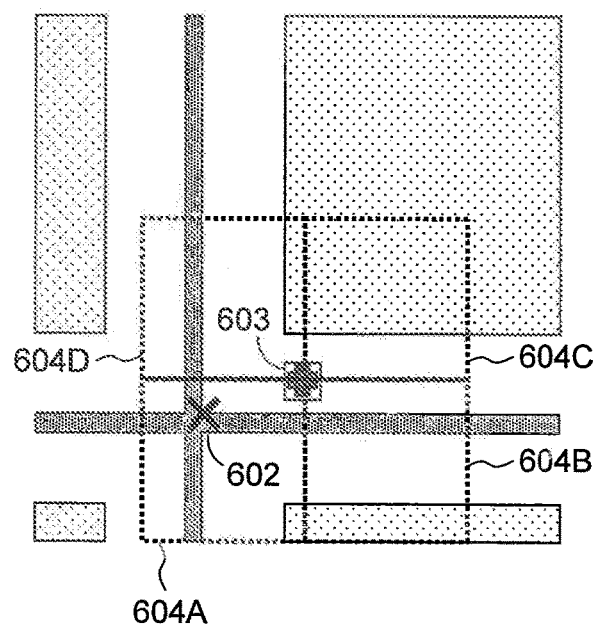
Figure 6C:
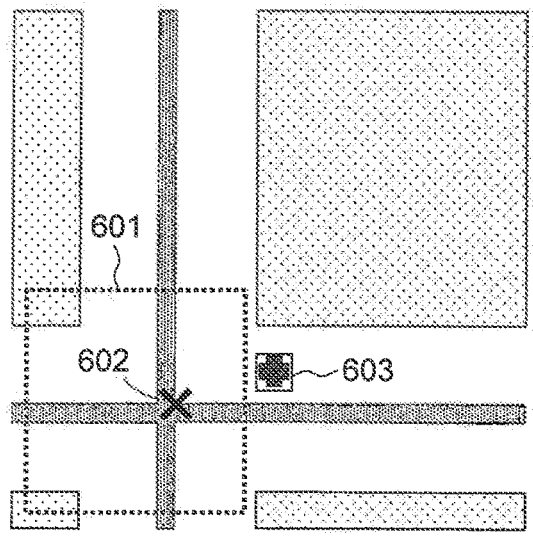

FIGS. 6A to 6C show the positional relationship among a neighboring image 601, alignment reference position coordinates 602, and a template image 603. As shown in FIG. 6A, the neighboring image 601 may be captured at a lower magnification than when the template image 603 was captured so that the neighboring image 601 includes the template image 603, for example. Alternatively, as shown in FIG. 6B, the neighboring image 601 may be defined as an image obtained by joining a plurality of images 604A to 604D that have been captured while moving the imaging field of view around the template image 603, for example. FIG. 6B represents a case where the neighboring image 601 is generated by joining the four images 604A to 604D. As a further alternative, as shown in FIG. 6C, the neighboring image 601 need not include the template image 603.

Next, the semiconductor defect review apparatus 100 calculates a quantity representing the features of the neighboring image 601 (step S505). Examples of a quantity representing the features include the quantity of edge components, the frequency of appearance of edge directions, and the frequency of appearance of straight lines or corners in the image. Needless to say, the present invention is not limited thereto, and it is also possible to determine a quantity representing the features on the basis of other known references. It is also possible to determine a quantity representing the features using a plurality of methods and combine the determined quantities.

Next, the semiconductor defect review apparatus 100 registers an image set in a template group (step S506).

Figure 7A:
FIGS. 7A to 7C are diagrams illustrating information included in an image set.
Figure 7B:
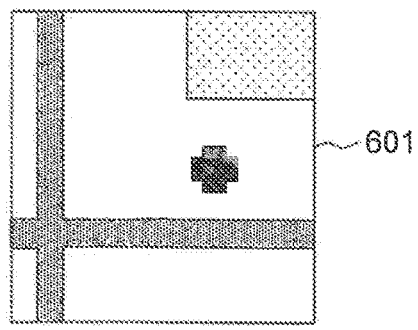
Figure 7C:
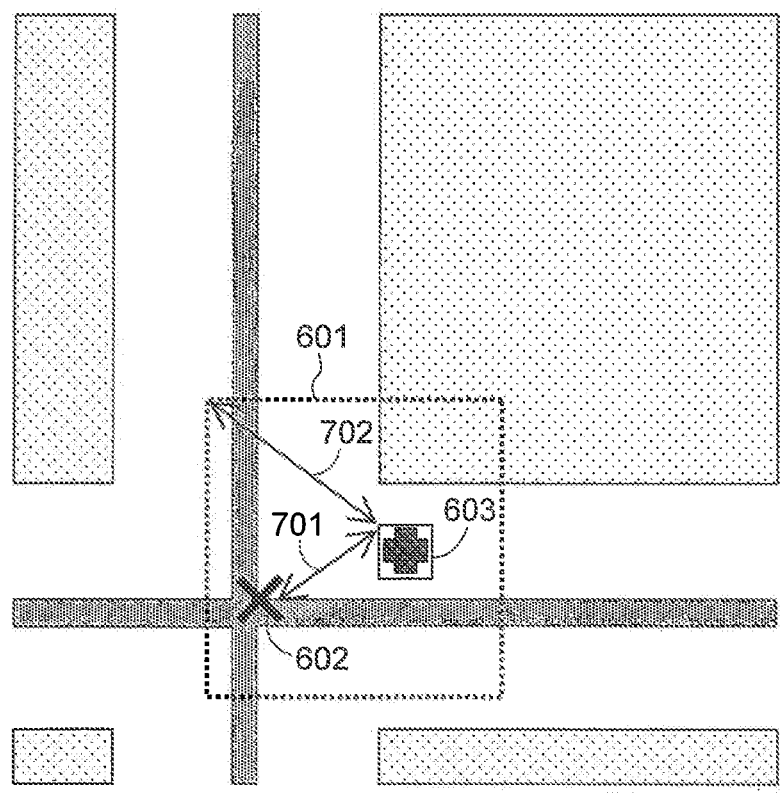

FIGS. 7A to 7C show a part of information registered as an image set. The image set includes image information, position information, and a similarity threshold. The image information includes two: the template image 603 captured in step S502 (FIG. 7A) and the neighboring image 601 captured in step S504 (FIG. 7B). The position information includes three: the alignment reference position coordinates 602, a relative distance 701 between the alignment reference point position coordinates 602 and the template image 603 (FIG. 7C), and a relative distance 702 between the template image 603 and the neighboring image 601 (FIG. 7C).

As described above, an image set is given by a single template image 603 and information associated therewith. Note that the relative distance 702 between the template image 603 and the neighboring image 601 is one of pieces of information that are characteristic of the pattern matching process in accordance with this embodiment.

Figure 8A:
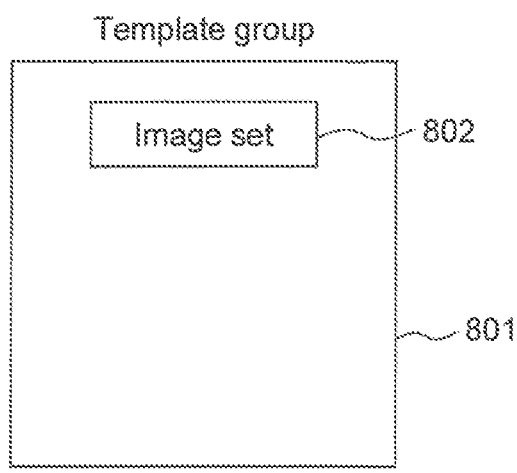
FIGS. 8A and 8B are diagrams showing the relationship between a template group and an image set.
Figure 8B:
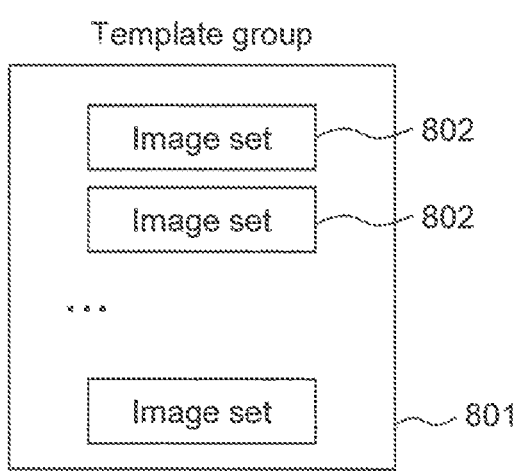

FIGS. 8A and 8B each show an image of the template group 801. Cases are considered where the template group 801 includes only a single image set 802 (a template image and a neighboring image) acquired with reference to the identical alignment reference position coordinates 602 (FIG. 8A) and a plurality of image sets 802 acquired with reference to the identical alignment reference coordinates 602 (FIG. 8B). As described above, a template group is a group of information corresponding to a single set of the alignment reference position coordinates 602. The advantages of using the template group 801 will become apparent later.

FIG. 9 shows the pattern matching process used in step S407 (FIG. 4-2). The semiconductor defect review apparatus 100 captures an image of a region around the alignment reference position coordinates 602 in registration of a template as a search target image (step S901).

Next, the semiconductor defect review apparatus 100 selects an image set 802 from the template group 801 (step S902). Examples of a method of selecting the image set 802 include a method of preferentially selecting an image set that has been added at the latest point in time and a method of selecting an image set for which the matching success rate is the highest. Besides, it is also possible to adopt a method of determining from the search target image quantities representing the features of the image and selecting an image set having a feature quantity that is close to the quantity representing the features of the neighboring image 601 determined in step S505.

Figure 10A:
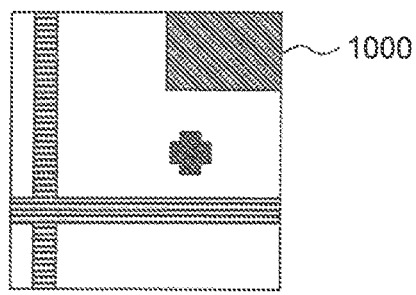
FIGS. 10A to 10C are diagrams illustrating an overlapped region of (a region common to) a search target image and a neighboring image.
Figure 10B:
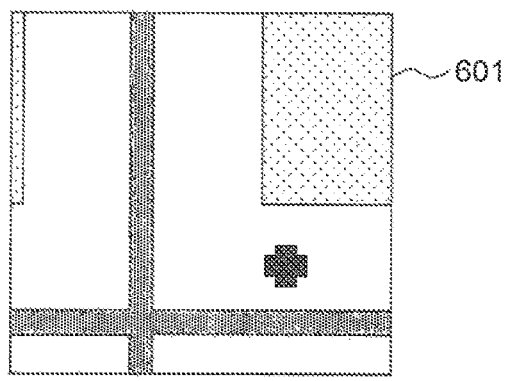
Figure 10C:
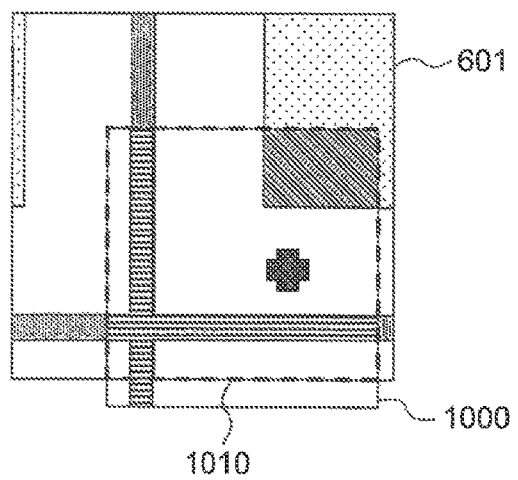

Next, the semiconductor defect review apparatus 100 determines an overlapped region of (a region common to) the search target image captured in step S901 and the neighboring image 601 included in the selected image set 802 (step S903). FIGS. 10A to 10C each show the relationship between a search target image 1000 (FIG. 10A), the neighboring image 601 (FIG. 10B), and an overlapped region (a common region) 1010 thereof (FIG. 10C). As shown in FIG. 10C, the overlapped region 1010 is a region including a pattern that is similar to both the search target image 1000 and the neighboring image 601. The method of determining the overlapped region 1010 may be a method of determining from the two images positions with the highest correlation while shifting the two images and then determining a common region from the shift amount, or a method of determining from the two images portions whose features are identical and determining a common region from the positions. Needless to say, other known algorithms may also be used.

Next, the semiconductor defect review apparatus 100 determines, with respect to the overlapped region 1010 determined in step S903, to what degree the search target image 1000 has changed form the neighboring image 601, which is a second template image, as a numerical value (step S904). For the numerical value herein, a correlation value between the search target image 1000 and the neighboring image 601 in the overlapped region 1010 can be used, for example. Alternatively, for example, it is also possible to use a numerical value calculated using any reference or method, such as the degree of matching between edges extracted from the two images, a score of comparison between the feature quantities of shapes, or the amount of change of a line width or a hole diameter.

Next, the semiconductor defect review apparatus 100 increases or decreases the similarity threshold included in the image set 801 according to the amount of change calculated in step S904 (S905). By increasing or decreasing the similarity threshold, it becomes possible to suppress the possibility of failures of pattern matching due to a decrease of a similarity resulting from a change in the pattern due to variations in the manufacturing steps or manufacturing variations.

The similarity threshold may be increased or decreased by any method. However, the method of increasing or decreasing the similarity threshold in accordance with the reference or method adopted in step S904 is desirably used. For example, when a correlation value n (the magnitude of a vector) in the range of 0.0 to 1.0 is used as the amount of change, provided that a similarity threshold that is increased or decreased relative to a similarity threshold R (the magnitude of a vector) is R' (the magnitude of a vector), R' can be given by the following formula.

$$R' = R - R \times (1-n) \times k$$

Herein, k is a parameter that determines how much influence the correlation value n has on the threshold R'. k is in the range of 0.0 to 1.0.

Next, the semiconductor defect review apparatus 100 searches the search target image 1000 for a region that is similar to the template image 603 (step S906).

Next, the semiconductor defect review apparatus 100 extracts as a candidate region for pattern matching a region with a similarity that is greater than the similarity threshold R' increased or decreased in step S905 (step S907). Herein, the semiconductor defect review apparatus 100 determines if there are two or more candidate regions (step S908).

If there are two or more candidate regions, the semiconductor defect review apparatus 100 performs a process of narrowing down the candidate regions, and uses a single candidate region obtained through the narrow down process as a result of the pattern matching (step S909). Details of the narrow down process are described below.

Meanwhile, if a plurality of candidate regions are not found, the semiconductor defect review apparatus 100 determines if the number of candidate regions is one (step S910). If even a single candidate region is present, the semiconductor defect review apparatus 100 uses the region as a result of the pattern matching.

Meanwhile, if no candidate region is found, the semiconductor defect review apparatus 100 adds a new image set 802 to the template group 801 (step S911). The details of the adding process are described below.

Figure 11A:
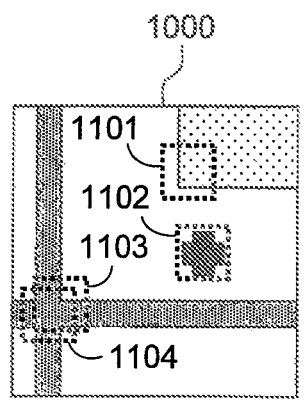
FIGS. 11A to 11C are diagrams illustrating the details of a narrow down process executed when a plurality of candidate regions are extracted.
Figure 11B:
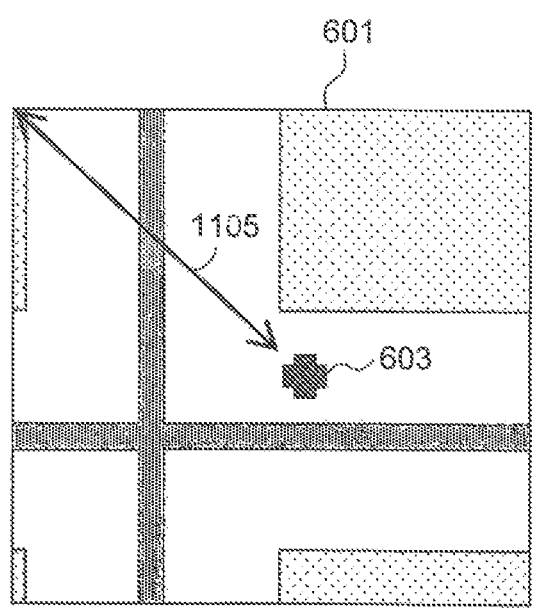
Figure 11C:
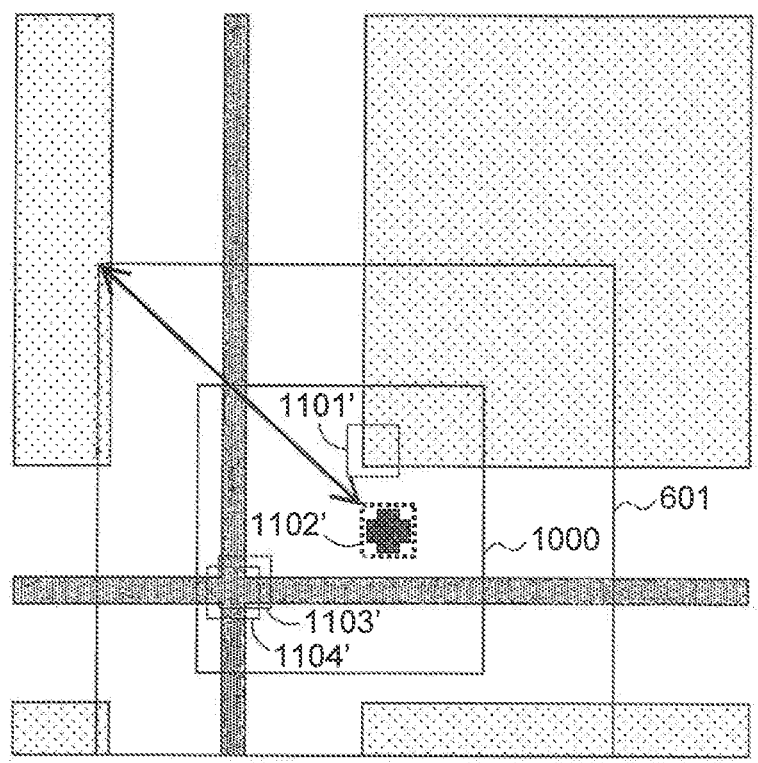

FIGS. 11A to 11C illustrate the process of narrowing down the candidate regions executed in step S909. Herein, as shown in FIG. 11A, a case is supposed where the search target image 1000 includes regions 1101 to 1104 that are similar to the template image 603. When the similarity threshold registered in the image set 802 is decreased in step S905, for example, the number of regions extracted in step S907 typically increases. Note that there is a possibility that patterns in the search target image 1000 may have changed from those at the registration of the template image 603. In such a case, a region with the highest similarity is not necessarily a region for which pattern matching should be performed.

FIG. 11B shows the neighboring image 601 registered in the image set 802. An arrow 1105 in FIG. 11B represents the relative distance between the neighboring image 601 and the template image 603 recorded in the image set 802. Herein, the relative distance is defined as the distance between the upper left corner of the neighboring image 601 and the template image 603.

When FIG. 11A, FIG. 11B, and a background pattern thereof are overlaid one on top of the others with reference to the overlapped region 1010 of the search target image 1000 and the neighboring image 601 determined in step S903, FIG. 11C results. In the case of FIG. 11, the overlapped region 1010 coincides with the search target image 1000. Regions 1101' to 1104' in FIG. 11C correspond to the regions 1101 to 1104 in FIG. 11A.

The semiconductor defect review apparatus 100 determines, among the four regions 1101' to 1104', the region 1102' with position information that is the closest to the relative distance between the neighboring image 601 and the template image 603 to be a narrow down target. As described above, the semiconductor defect review apparatus 100 narrows down a plurality of candidate regions to a single region using information on the relative distance between the neighboring image 601 and the template image 603 that provides a relatively global positional relationship. Note that using the overlapped region 1010 is advantageous in, when the neighboring image 601 does not include the template image 603 as shown in FIG. 6C, for example, identifying the global positional relationship between the neighboring image 601 and the template image 603.

That is, the semiconductor defect review apparatus 100 narrows down a plurality of candidate regions to a single region by also using the global matching result such as the relative distance between the neighboring image 601 and the template image 603 or the positional relationship obtained from the overlapped region 1010.

FIG. 12 is a diagram illustrating the process of adding a new image set executed in step S911. Needless to say, this process is executed when a search target region includes no region whose similarity is above the similarity threshold in step S910.

First, the semiconductor defect review apparatus 100 receives information on the alignment reference position coordinates designated/input from an operator (step S1201).

Next, the semiconductor defect review apparatus 100, on the basis of the information on the designated alignment reference position coordinates, captures an image of a predetermined region as a template image (step S1202). The image capturing position herein is determined within a single region according to the relative distance between the alignment reference position coordinates and the region of the template image included in the image set 802.

Next, the semiconductor defect review apparatus 100 calculates a similarity threshold for the captured template image (step S1203). The method of calculating the similarity threshold is the same as that used in step S503 shown in FIG. 5.

Next, the semiconductor defect review apparatus 100 captures the neighboring image 601 (step S1204). The neighboring image 601 captured in step S1204 may have the same field of view as or a different field of view from the image set 802 selected in step S902.

Next, the semiconductor defect review apparatus 100 calculates a quantity representing the features of the neighboring image 601 (step S1205). The method of calculating a quantity representing the features is the same as that used in step S505 shown in FIG. 5.

Next, the semiconductor defect review apparatus 100 registers in the template group 801, as a new image set 802, (1) the captured template image 603, (2) the captured neighboring image 601, (3) the calculated similarity threshold, (4) the designated/input alignment reference position coordinates, (5) the relative distance between the alignment reference position coordinates and the template image 603, and (6) the relative distance between the template image 603 and the neighboring image 601 (step S1206).

The image set 802 additionally registered as described above includes a template image for which pattern matching may fail with high possibility due to variations in the semiconductor manufacturing steps or manufacturing variations. It follows that the image set 802 accumulated in the template group 801 includes an image that has changed in various ways from the template image designated by an operator.

Consequently, the semiconductor defect review apparatus 100 in accordance with this embodiment that executes pattern matching by selecting an image set 802 in the template group 801 can automatically select an optimum image set 802 even when variations in the manufacturing steps or manufacturing variations are generated, and thus can maintain a high matching score. That is, the semiconductor defect review apparatus 100 can suppress failures of pattern matching.

Meanwhile, even when pattern matching fails, an operator can, only by designating/inputting the alignment reference position coordinates, for example, have the template image 603 be automatically captured, and additionally registered in the template group 801 together with the neighboring image 601. A point that is characteristic herein is that the operator does not designate a region of the template image. Thus, the operator is not required to grasp changes in how patterns look due to variations in the manufacturing steps or the manufacturing variations unlike in the conventional art. Consequently, the semiconductor defect review apparatus 100 in accordance with this embodiment can automatically lean the template image 603 for which pattern matching may fail with high possibility and train the template group 801 without placing a burden on the operator (i.e., without the need for a special instruction or knowledge).

Other Embodiments

The present invention is not limited to the aforementioned embodiments, and includes various variations. For example, although the aforementioned embodiments have been described in detail to clearly illustrate the present invention, the present invention need not include all of the structures described in the embodiments. It is possible to replace a part of a structure of an embodiment with a structure of another embodiment. In addition, it is also possible to add, to a structure of an embodiment, a structure of another embodiment. Further, it is also possible to, for a part of a structure of each embodiment, add/remove/substitute a structure of another embodiment.

Some or all of the aforementioned structures, functions, processing units, processing means, and the like may be implemented as an integrated circuit or other hardware, for example. Alternatively, each of the aforementioned structures, functions, and the like may be implemented such that a processor analyzes and executes a program that implements each function. That is, each of the aforementioned structures, functions, and the like may be implemented as software. Information such as the program that implements each function, tables, and files can be stored in a storage device such as memory, a hard disk, or a SSD (Solid State Drive); or a storage medium such as an IC card, an SD card, or a DVD.

In addition, the control lines and information lines represent those that are considered to be necessary for description purposes, and represent not all control lines and information lines that are necessary for a product. In practice, almost all structures may be considered to be mutually connected.

REFERENCE SIGNS LIST

100: Semiconductor defect review apparatus
301: Electron gun
302: Lens
303: Deflector
304: Objective lens
305: Semiconductor wafer
306: Stage
307: Secondary particle detector
308: Optical camera
309: Electron optics control unit
310, 311: A/D converter units
312: Stage control unit
313: Overall control unit
314: Image processing control unit
315: Display
316: Keyboard
317: Storage device
318: Mouse
319: Electron beam
320: Secondary particles
601: Neighboring image
602: Alignment reference position coordinates
603: Template image
701: Relative distance between template image and alignment reference position coordinates 702: Relative distance between template image and neighboring image
801: Template group
802: Image set
1000: Search target image
1010: Overlapped region

What is claimed is:

1. A pattern matching method for matching a search target image comprising:
    capturing a search target image formed based on an output of a particle detector configured to detect a secondary particle emitted from an irradiation region of a charged particle beam;
    selecting a first template image and a second template image, the second template image having a field of view wider than a field of view of the first template image;
    overlaying the search target image and the second template image one on top of the other;
    determining, using an image processor, a similarity degree comprising a correlation value, of a common region of the overlaid search target image and the second template image;
    adjusting, using the image processor, a similarity threshold on the basis of a result of the evaluation of the similarity degree using the first template image, wherein the similarity threshold determines a matching position or a candidate of the matching position from the search target image, and wherein the adjusting of the similarity threshold is performed in accordance with the correlation value such that the similarity threshold decreases as the correlation value decreases;
    searching, using the image processor, for the matching position and the candidate of the matching position in the search target image, using the first template image and the adjusted similarity threshold, within the search target image whose similarity degree has been evaluated; and
    extracting a region of the search target image having a pattern similarity which exceeds the adjusted similarity threshold.

2. The pattern matching method according to claim 1, further comprising, when the result of the matching between the first template image and the search target image is below the similarity threshold:
    registering, using the image processor, a first template image newly set in or around the search target image, and a new second template image including the newly set first template image or a pattern around the newly set first template image.

3. The pattern matching method according to claim 2, further comprising:
    registering, using the image processor, position information on alignment reference position coordinates corresponding to the first template image, and position information on the first and second template images, together with the first and second template images.

4. The pattern matching method according to claim 1, further comprising, when a plurality of regions whose similarities are evaluated to be above the similarity threshold are detected in the search target image:
    setting, with the image processor, a region with a highest reliability among the plurality of regions as a matched region on the basis of position information on the second template image and the first template image.

5. A pattern matching apparatus for matching a search target image, the apparatus comprising:
    a charged particle beam source configured to irradiate a surface of a sample with a charged particle beam;
    a particle detector configured to detect a secondary particle emitted from an irradiation region of the charged particle beam; and
    an image processor configured to perform image processing based on an output of the particle detector,
    wherein a storage device accessible by the image processor comprises a non-transitory memory storing a first template image for local matching, a second template image for global matching having a field of view wider than the first template image, and a sequence of programmed instructions which, when executed by the image processor, cause the image processor to
        capture a search target image formed based on an output of the particle detector;
        overlay the search target image and the second template image one on top of the other;
        determine a similarity degree comprising a correlation value of a common region of the overlaid search target image and the second template image;
        adjust a threshold value used for determining a matching candidate in accordance with the correlation value such that the similarity threshold decreases as the correlation value decreases; and
        perform template matching using the first template image and the adjusted threshold value within the search target image whose similarity degree has been evaluated; and
        extract a region of the search target image having a pattern similarity which exceeds the adjusted similarity threshold.

6. The pattern matching apparatus according to claim 5, wherein
    the image processor is further configured to, when the result of matching between the first template image and the search target image is below the similarity threshold, register a first template image newly set in or around the search target image and a new second template image including the newly set first template image or a pattern around the newly set first template image.

7. The pattern matching apparatus according to claim 6, wherein the image processor is further configured to register position information on alignment reference position coordinates corresponding to the first template image, and position information on the first and second template images, together with the first and second template images.

8. The pattern matching apparatus according to claim 5, wherein the image processor is further configured to, when a plurality of regions whose similarities are evaluated to be above the similarity threshold are detected from the search target image, set, as a matched region, a region with a highest reliability among the plurality of regions on the basis of position information on the second template image and the first template image.

9. A non-transitory computer-readable medium, storing program instructions executed on a computer system for performing a computer-implemented method for performing template matching using a template image, which, when executed by the computer system, cause the computer system to perform the computer-implemented method comprising:
    capturing a search target image formed based on an output of a particle detector configured to detect a secondary particle emitted from an irradiation region of a charged particle beam;

selecting a first template image and a second template image, the second template image having a field of view wider than a field of view of the first template image;

overlaying the search target image and the second template image one on top of the other;

determining a similarity degree comprising a correlation value of a common region of the overlaid search target image and the second template image;

adjusting a similarity threshold used for determining matching, as the threshold to determine a matching candidate, wherein when performing a search using the first template image, wherein the adjusting of the similarity threshold is performed in accordance with the correlation value such that the similarity threshold decreases as the correlation value decreases;

performing template matching using the first template image and the adjusted threshold within the search target image whose similarity degree has been evaluated; and extracting a region of the search target image having a pattern similarity which exceeds the adjusted similarity threshold.

* * * * *